United States Patent [19]

Hastings

[11] Patent Number: 4,925,137
[45] Date of Patent: May 15, 1990

[54] LEVELING MECHANISM FOR TRIPOD BASE

[75] Inventor: Thomas C. Hastings, Willowdale, Canada

[73] Assignee: Coleman Outdoor Products, Inc., Wichita, Kans.

[21] Appl. No.: 249,701

[22] Filed: Sep. 27, 1988

[51] Int. Cl.⁵ .............................................. A47G 23/02
[52] U.S. Cl. ..................................... 248/148; 126/30; 248/168; 248/188.2
[58] Field of Search .................... 248/188.2, 180, 178, 248/168, 649, 650, 188.6, 188.7, 188.8, 148, 150, 151; 126/30, 40

[56] References Cited

U.S. PATENT DOCUMENTS

| | | |
|---|---|---|
| 1,199,059 | 9/1916 | Doty . |
| 2,518,817 | 8/1950 | Ries ................................. 248/168 |
| 2,531,252 | 11/1950 | Brunson . |
| 3,147,553 | 9/1964 | Cogswell . |
| 3,473,771 | 10/1969 | Newman .................... 248/188.6 X |
| 3,480,250 | 11/1969 | Hankins .......................... 248/168 |
| 3,893,647 | 7/1975 | Kennedy ..................... 248/231 X |
| 3,921,947 | 11/1975 | Adam ........................ 248/168 X |
| 3,933,146 | 1/1976 | Hastings . |
| 4,061,302 | 12/1977 | Boone ...................... 248/188.6 X |
| 4,309,010 | 1/1982 | Posso ............................. 248/168 |
| 4,317,552 | 3/1982 | Weidler ......................... 248/168 |

Primary Examiner—David L. Talbott

[57] ABSTRACT

A leveling mechanism is provided for a campstove which includes a base and a plurality of legs which are pivotally attached to the base. The leveling mechanism is a ring-shaped band which is inserted between the legs and the base. A camming ramp extends over a portion of the circumference of the band and progressively increases the thickness of the band. The band is rotatable to position the camming ramp between one of the pivoting legs and the base for pivoting the leg away from the base.

12 Claims, 2 Drawing Sheets

U.S. Patent    May 15, 1990    Sheet 1 of 2    4,925,137
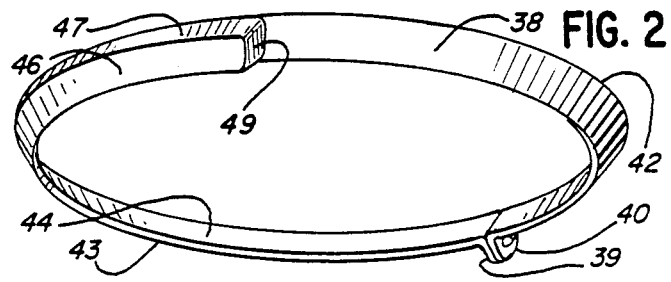
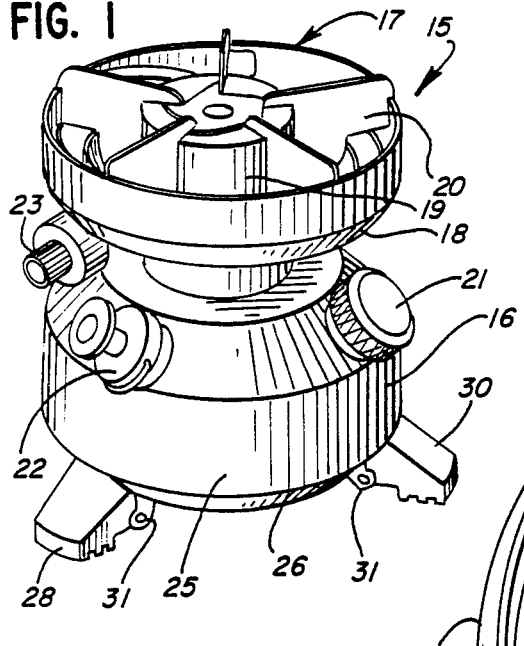
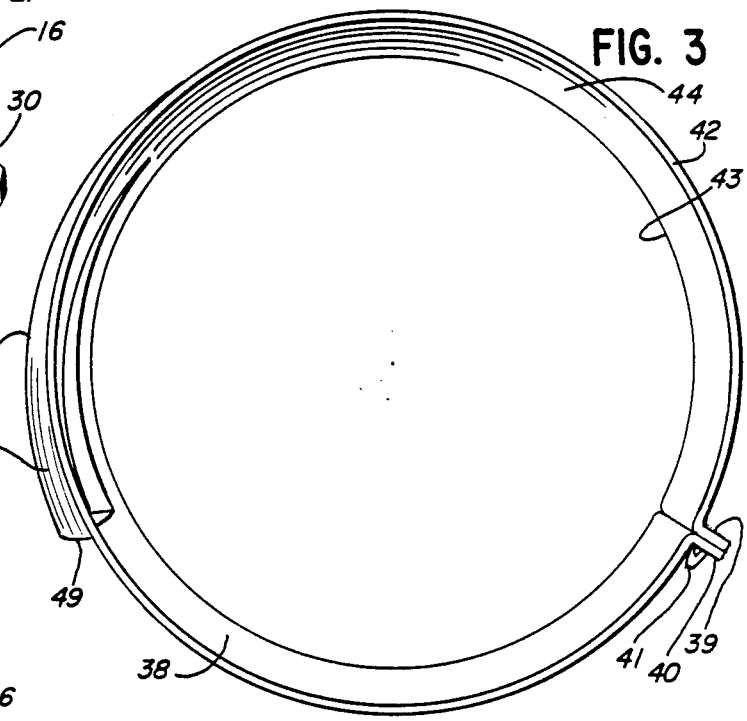
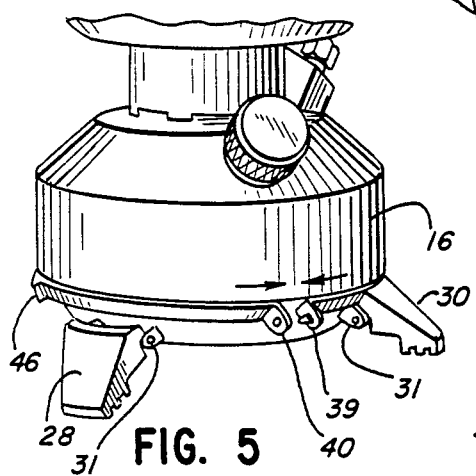
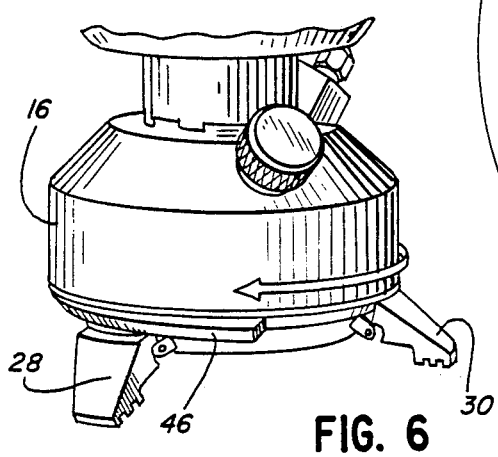
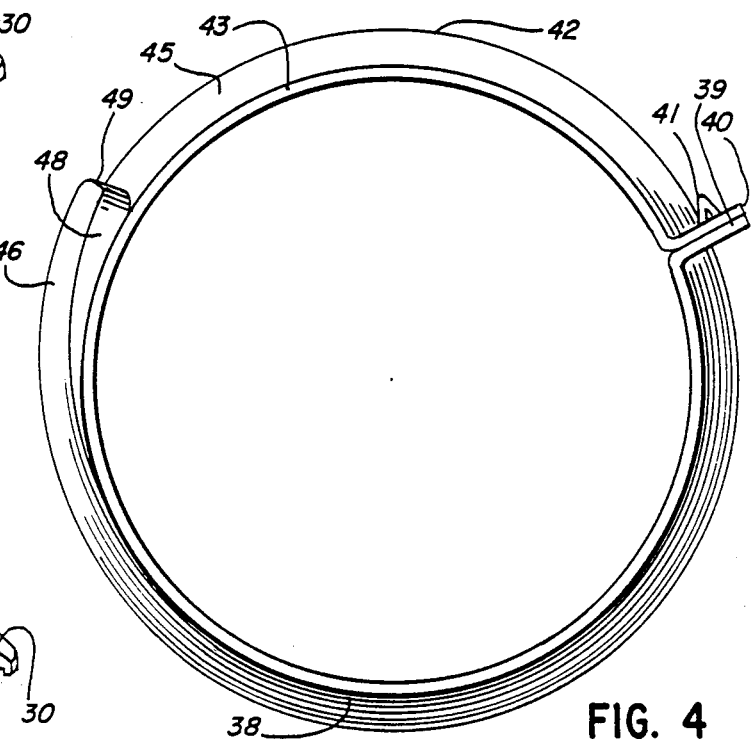

LEVELING MECHANISM FOR TRIPOD BASE

BACKGROUND

This invention relates to a leveling mechanism for a tripod base. The invention enjoys particular utility with a campstove which has three pivoting legs. It will be understood, however, that the leveling mechanism can be used with other products. Further, the leveling mechanism can be used with bases which include four or more legs, and the term "tripod" as used herein is not meant to be limited to a three-legged support.

A campstove, particularly a backpacking campstove, is often used on rugged terrain. Such terrain is usually not level, and it is often difficult to make the stove stand upright. If the burner assembly of the stove is not level, the cooking utensil which is supported on the stove is apt to fall off. In that event, the user could be injured by hot liquid or food, and the meal could be lost or rendered inedible.

SUMMARY OF THE INVENTION

The leveling mechanism consists of a ring-shaped band which is sized to fit between the pivoting legs of a campstove and the base of the campstove. A camming ramp extends over a portion of the circumference of the band and progressively increases the thickness of the band. The band is rotatable to position a desired portion of the camming ramp between one of the legs and the base. The camming ramp pivots the leg and changes the inclination of the leg relative to the other legs, thereby lowering the bottom of the leg.

DESCRIPTION OF THE DRAWING

The invention will be explained in conjunction with an illustrative embodiment shown in the accompanying drawing, in which FIG. 1 is a perspective view of a campstove;

FIG. 2 is a perspective view of a leveling band for use with the campstove;

FIG. 3 is a top plan view of the leveling band;

FIG. 4 is a bottom plan view of the leveling band;

FIG. 5 is a perspective view showing the leveling band being positioned on the campstove;

FIG. 6 is a perspective view showing the leveling band being adjusted;

DESCRIPTION OF SPECIFIC EMBODIMENT

Figure 7:
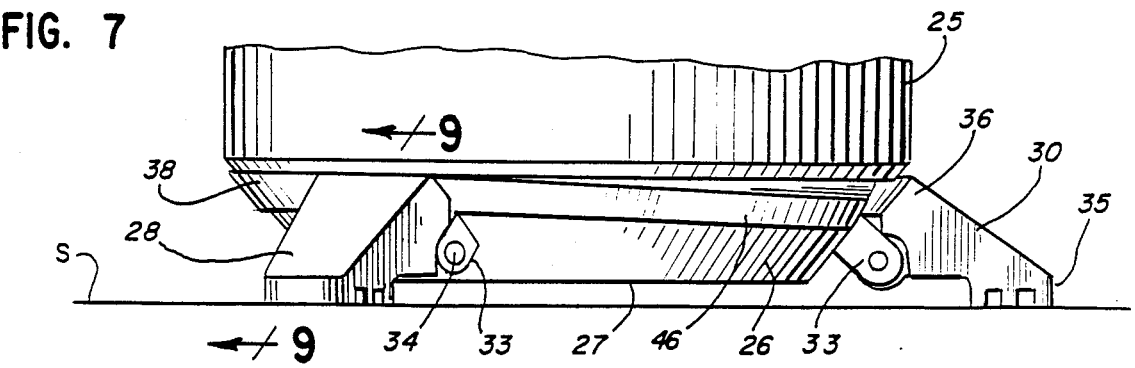
FIG. 7 is a fragmentary side elevational view showing all three legs of the campstove in a level position.

Referring to FIG. 1, a campstove 15 includes a base 16 and a burner assembly 17. The particular campstove illustrated is a compact single burner stove which is suitable for use by backpackers.

The burner assembly 17 includes a reflector bowl 18, a burner box 19, and a plurality of grids 20 which are adapted to support a cooking utensil such as a pot or a pan. The base 16 provides a fuel tank, and a fill spout for the tank is closed by a cap 21. The tank is pressurized by a hand pump 22, and fuel flow to the burner box is controlled by a valve 23.

Figure 8:
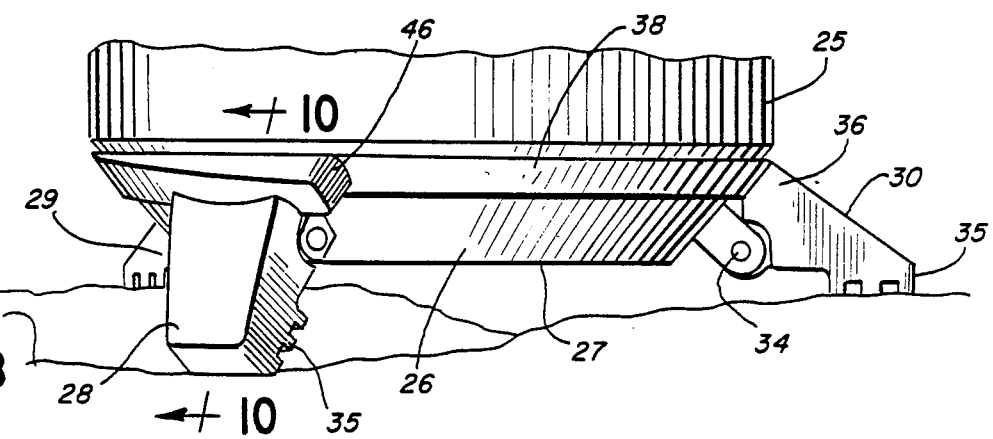
FIG. 8 is a fragmentary elevational view showing the leveling band rotated to pivot one of the legs below the other two legs.
Figure 9:
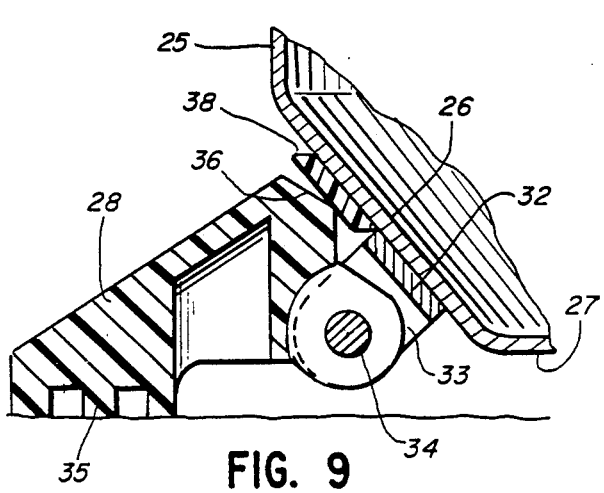
FIG. 9 is a fragmentary sectional view taken along the line 9—9 of FIG. 7.
Figure 10:
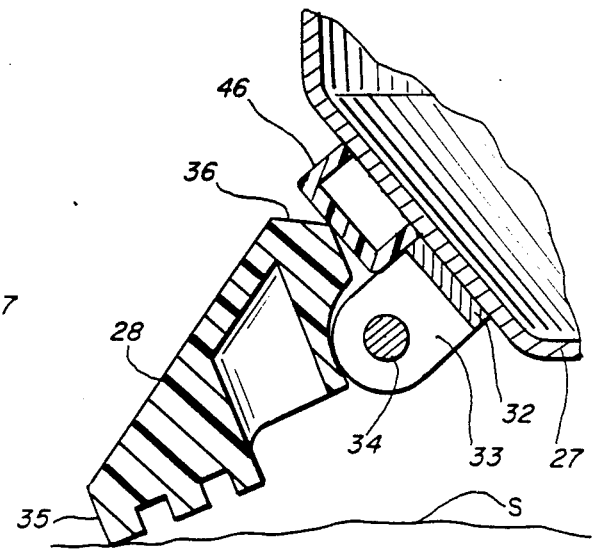
FIG. 10 is a fragmentary sectional view taken along the line 10—10 of FIG. 8.

The base includes a cylindrical side wall 25, a frusto-conical wall 26 which converges downwardly, and a flat bottom wall 27 (FIG. 8). Three support legs 28, 29, and 30 are pivotally attached to the frusto-conical wall 26 by U-shaped brackets 31. Each bracket includes a bight portion 32 (FIGS. 9 and 10) which is spotwelded to the frusto-conical wall and a pair of end portions 33. A pin 34 extends through the end portions and through the leg for pivotally securing the leg.

Each leg includes a foot portion 35 which engages the supporting surface and a stop portion 36 (FIGS. 9 and 10) which engages the frusto-conical wall 26. In the particular embodiment illustrated, the stop portions 36 are V-shaped, and the foot portions have a serrated bottom surface. When the legs are in their supporting position as illustrated in FIG. 1, the stop portions of the legs engage the frusto-conical wall, and the legs extend angularly outwardly from the base at an angle relative to the vertical centerline or axis of the campstove.

The campstove which has been described is conventional and was available prior to the invention of the leveling mechanism which is described herein.

The leveling mechanism comprises a ring-shaped band 38 (FIGS. 2-4). The band is segmented or split and includes a pair of opposed end portions 39 and 40 which extend radially outwardly. A pin 41 is molded integrally with the end portion 39 and is adapted to be snapped into an opening in the end portion 40 to hold the opposed end portions together.

The band 38 is generally frusto-conical and includes a circular top edge 42, a circular bottom edge 43 which has a smaller diameter than the top edge 42, and inside surface 44 which is adapted to mate with the frusto-conical wall 26 of the campstove, and an outside surface 45. The thickness of the band is uniform over a major portion of its circumference, but the outside surface 45 extends outwardly away from the top and bottom edges to form a camming ramp 46. The camming ramp includes top and bottom walls 47 and 48 which extend outwardly from the top and bottom edges 42 and 43, respectively, and generally radially extending end wall 49. The band may be injected molded in one piece from plastic.

The leveling band is mounted on the campstove by positioning the band around the frusto-conical wall 26 of the campstove as shown in FIG. 5. The legs 28-30 can be pivoted away from the wall 26 to permit the band to be positioned between the stop portion 36 of the legs and the wall 26. The opposed end portions 39 and 40 are pulled together, and the pin 41 is snapped through the opening in the end portion 40 to retain the band around the campstove. The band can rotate relative to the frusto-conical wall 26, and the brackets 31 prevent the band from slipping downwardly away from the frusto-conical wall.

The arcuate length of the camming ramp 46 is less than the length of the arcs between the legs 28-30. The band can therefore be positioned so that the camming ramp is between adjacent legs and does not engage any legs as shown in FIG. 7. In that position the portion of the band having constant thickness is positioned between the frusto-conical wall 26 and the stop portion 36 of each of the legs 28-30. Each leg therefore extends at the same angle relative to the vertical axis or centerline of the campstove, and the campstove will be maintained level when the supporting surface S is level as illustrated in FIG. 7.

When the supporting surface S is uneven as illustrated in FIG. 8, the leveling band is rotated to bring the camming ramp 46 into engagement with the stop portion 36 of one of the legs. In FIG. 8 the camming ramp engages the leg 28 and causes that leg to pivot downwardly so that its foot portion 35 is below the foot portions 35 of the legs 29 and 30. The vertical distance between the foot portion of the leg 28 and the foot portions of the other legs can be adjusted as needed by rotating the camming ramp. The legs 29 and 30 engage portions of the supporting surface which have the same elevation, and the position of the leg 28 is adjusted to level the campstove.

While the invention has been described in combination with a campstove, it will be understood that the leveling band can be used with other devices which are supported by pivoting legs. A detailed description of a specific embodiment of the invention has been set forth for purposes of illustration, but many of the details herein given may be varied considerably by those skilled in the art without departing from the spirit and scope of the invention.

I claim:

1. A leveling mechanism for a base having a plurality of legs pivotally attached to the base, the leveling mechanism comprising a ring-shaped band, means for securing the band on the base, and a camming ramp on the band which extends over a portion of the circumference of the band for increasing the thickness of the band along said portion of the circumference of the band, the thickness of the band being substantially uniform except in the area of the camming ramp, the camming ramp having a length which is shorter than the distance between any two legs.

2. The leveling mechanism of claim 1 in which the band is segmented and includes a pair of opposed end portions, said securing means comprising means for holding the opposed end portions together.

3. The leveling mechanism of claim 2 in which said securing means comprises a pin which extends from one of the opposed end portions of the band through the other opposed end portion.

4. The leveling mechanism of claim 1 in which the band has a frusto-conical shape and includes a circular lower edge and a circular upper edge which has a larger diameter than the lower edge.

5. In combination, a base having a plurality of legs pivotally attached to the base and a leveling mechanism,
    each of the legs having a pivot portion which is pivotally attached to the base and a stop portion which is engagable with a base for maintaining the legs in a supporting position,
    the leveling mechanism comprising a ring-shaped band having a camming ramp which extends over a portion of the circumference of the band for increasing the thickness of the band along said portion of the circumference of the band, the band being rotatably mounted on the base and positioned between the base and each of the stop portions of the legs, said camming ramp having a length which is shorter than the distance between any two legs, whereby the camming ramp can be rotated into engagement with one of the stop portions to pivot said one stop portion from the base.

6. The structure of claim 5 in which the base and the band each have an inverted frusto-conical shape.

7. The structure of claim 5 in which the band is segmented and includes a pair of opposed end portions, and a pin which extends from one of the opposed end portions through the other opposed end portion whereby the band is releasably mounted on the base.

8. The structure of claim 7 in which the pin is molded integrally with said one opposed end portion.

9. The structure of claim 5 in which the length of the camming ramp is less than the distance between adjacent legs so that the camming ramp cannot engage more than one leg at a time and can be positioned between adjacent legs so that the camming ramp does not engage any leg.

10. A campstove apparatus comprising: a burner member; a base member; a plurality of legs pivotally attached to the base; and a leveling mechanism including a ring-shaped band, means for securing the band on the base, and a camming means on the band for varying the angle between one leg and the base in relation to the angle between another leg and the base, said camming means extending over a portion of the circumference of the band, said portion being shorter than the circumference of the band, the thickness of the band being substantially uniform except in the area of the camming means.

11. The campstove apparatus of claim 10 wherein the band has a frusto-conical shape and includes a circular lower edge and a circular upper edge which has a larger diameter than the lower edge.

12. A leveling mechanism for a base having a plurality of legs pivotally attached to the base, the leveling mechanism comprising a ring-shaped band, means for securing the band on the base, and camming means on the band for varying the angle between one leg and the base in relation to the angle between another leg and the base, said camming means extending over a portion of the circumference of the band, said portion being shorter than the circumference of the band, the thickness of the band being substantially uniform except in the area of the camming means.

* * * * *